United States Patent [19]
Song et al.

[11] Patent Number: 6,130,274
[45] Date of Patent: Oct. 10, 2000

[54] AQUEOUS DISPERSION OF LOW-TEMPERATURE CURABLE CATIONIC ELECTRODEPOSITION RESIN COMPOSITION AND PROCESS FOR PREPARING THE SAME

[75] Inventors: Ki-Myong Song; Jong-Myung Hong; Hoon Chung; Seung-Jae Back, all of Kyeongki-Do, Rep. of Korea

[73] Assignee: Daihan Paint & Ink Co., Ltd., Rep. of Korea

[21] Appl. No.: 09/115,849

[22] Filed: Jul. 15, 1998

[51] Int. Cl.$^7$ .............................. C08K 3/20; C08L 63/02
[52] U.S. Cl. ......................... 523/411; 204/504; 523/412
[58] Field of Search ................................ 523/411, 412; 204/504

[56] References Cited

U.S. PATENT DOCUMENTS 3,984,299 10/1976 Jerabek .
4,865,705 9/1989 Hendrikx .

*Primary Examiner*—Robert Dawson
*Assistant Examiner*—D. Aylward
*Attorney, Agent, or Firm*—Ostrolenk, Faber, Gerb & Soffen, LLP

[57] ABSTRACT

Disclosed are an aqueous dispersion for a low-temperature curable cationic electrodeposition coating composition and a process for preparing the same in which the dried coating film of the electrodeposition paint has an epoxy-acrylic double-layered structure for displaying excellent properties, and in which an organic solvent content can be minimized to zero. The aqueous dispersion of the cationic electrodeposition coating composition can be manufactured by using (a) a cationic electrodeposition synthetic resin which is obtained by an amino addition reaction of a polyepoxide, (b) an acrylic cationic electrodeposition resin having an amino group, (c) an ester-modified styrene-allylalcohol copolymer synthesized by an esterification reaction of styrene-allylalcohol copolymer with a fatty acid; and (d) a polyurethane-type crosslinking agent prepared by the reaction of methyethyl ketoxime-partially-blocked diisocyanate with trimethylol propane. The cationic electrodeposition coating composition by using the aqueous dispersion of the cationic electrodeposition resin composition has a superior low-temperature curability. The cured coated film has an epoxy-acrylic double-layered structure to give a high functionality, for improving properties such as weather-resistance, yellowing resistance, etc.

20 Claims, No Drawings

AQUEOUS DISPERSION OF LOW-TEMPERATURE CURABLE CATIONIC ELECTRODEPOSITION RESIN COMPOSITION AND PROCESS FOR PREPARING THE SAME

BACKGROUND OF THE INVENTION

The present invention relates to a novel aqueous dispersion of a low-temperature curable cationic electrodeposition resin composition and a process for preparing the same, and more particularly to a novel aqueous dispersion of the low-temperature curable cationic electrodeposition resin composition in which the electrodeposited coating film thereof has an epoxy-acrylic double-layered structure to give a high functionality and the aqueous dispersion is used for the preparation of a cationic electrodeposition paint composition having a low-temperature curability, and a process for preparing the same.

Cationic electrodeposition paint is widely used for primer coating of cars, household electric appliances, and industrial machines. Recent research at home and abroad on cationic electrodeposition paint have concentrated on paints related to energy conservation, safety, and environmental considerations. Also, research on binders of electrodeposition coating have concentrated on developing highly functional and highly efficient electrodeposition paint having various purposes and characteristics. Among the research, studies on reducing organic solvent emissions from paint operations are being developed. The motive for these studies is the regulation of emission of organic solvents for the protection of the environment. As examples of regulations related to the regulation of emission of organic solvents, the regulation for volatile organic compounds (VOC) of the Environment Office in U.S. and the atmospheric purification law in Germany can be noted. The former establishes a guideline for the amount of organic solvents in a paint, while the latter restricts the amount of organic solvents discharged from the paint used for coating cars. Since about 20% of the amount of carbon dioxide discharged in the world are due to the coating industry (for example, organic solvent and combustion by means of a drying oven), the coating industry is a major cause of environmental pollution. Hence, the coating industry has become the subject of supervision.

Presently, as an electrodeposition coating composition for primer coating, epoxy cationic electrodeposition paints which are curable at a temperature above 160° C. are mainly used. However, the body of a vehicle and parts thereof have complicated structures and thus the temperature range for applying the epoxy cationic electrodeposition paints thereto at the above high temperature is wide. Due to these facts, a portion where the coated paints are not sufficiently cured may be generated. On this portion, there may be a problem that the anticorrosive property of the body or parts thereof become poor. Further, when the coated paint is dried at a high temperature, the reduced weight percentage of the coated paint is great and thus the used amount for the coated paint is increased. Accordingly, the costs for the coated paint is increased. In the meantime, these epoxy cationic electrodeposition paints are rich in organic solvents and these solvents are evaporated from the electrodeposition tank, thereby emitting an offensive odor in a workpiece. Also, these solvents are emitted during baking, so environmental pollution problems occur. Further, the conventional epoxy cationic electrodeposition paints, which may be cured at a high temperature, are lacking in properties such as weather-resistance, yellowing resistance, etc.

In the meantime, the present inventors have an invention entitled "IMPROVED CATIONIC ELECTRODEPOSITION COATING COMPOSITION AND A PROCESS FOR PREPARING THE SAME" wherein the electrodeposited coating film of the eletrodeposition coating composition has an epoxy-acrylic double-layered structure, and filed as U.S. patent application Ser. No. 08/928,044 on Sep. 11, 1997 and is now pending in the USPTO. However, the disclosed electrodeposition coating composition in the above U.S. patent application is cured at a temperature above 160° C. and thus can not be cured at a low temperature below 125° C.

Accordingly, the present inventors have made many efforts for obtaining an electrodeposition coating composition which may be cured at a temperature below 125° C. and accomplished the present invention.

SUMMARY OF THE INVENTION

Accordingly, it is an object of the present invention to provide an aqueous dispersion of a low-temperature curable cationic electrodeposition resin composition which is used for preparing a low-temperature curable cationic electrodeposition paint composition in which the electrodeposited coating film thereof has an epoxy-acrylic double-layered structure to give a high functionality, for improving properties such as weather-resistance, yellowing resistance, etc., and in which the organic solvent content can be minimized.

It is another object of the present invention to provide a process for preparing the above aqueous dispersion of a cationic electrodeposition resin composition particularly suited for manufacturing cationic electrodeposition coating.

In accordance with the present invention, there is provided an aqueous dispersion of a cationic electrodeposition coating composition. The cationic electrodepostion coating composition has: (a) about 40–60 percent by weight of a cationic electrodeposition synthetic resin which is obtained by an amino addition reaction of a polyepoxide resin; (b) about 5–10 percent by weight of an acrylic cationic electrodeposition resin having an amino group; (c) about 1–3 percent by weight of an ester-modified styrene-allylalcohol copolymer synthesized by an esterification reaction of styrene-allylalcohol copolymer and fatty acid; and (d) about 30–50 percent by weight of a polyurethane-type crosslinking agent prepared by the reaction of methyethyl ketoxime-partially-blocked diisocyanate with trimethylol propane.

Further, the present invention provides a method for manufacturing an aqueous dispersion of a cationic electrodeposition coating composition, comprising the steps of: preparing a cationic electrodeposition resin in the presence of an organic solvent by using (a) about 40–60 percent by weight of a cationic electrodeposition synthetic resin which is obtained by an amino addition reaction of a polyepoxide, (b) about 5–10 percent by weight of an acrylic cationic electrodeposition resin having an amino group, (c) about 1–3 percent by weight of an ester-modified styrene-allylalcohol copolymer synthesized by an esterification reaction of styrene-allylalcohol copolymer with a fatty acid; and (d) about 30–50 percent by weight of a polyurethane-type crosslinking agent prepared by the reaction of methyethyl ketoxime-partially-blocked diisocyanate with trimethylol propane; preparing an aqueous dispersion by mixing about 100 parts by weight consisting of a composition consisting about 35–45 percent by weight of the cationic electrodeposition resin composition and about 55–65 percent by weight of deionized water, 0.3–1.5 parts by weight of a neutralization agent and 0.5–1.0 parts by weight of a cationic surfactant; and stripping the organic solvent of the aqueous dispersion under a reduced pressure to partially remove the organic solvent from the water-dispersed solution, and filtering the water-dispersed solution.

DETAILED DESCRIPTION OF THE INVENTION

Hereinafter, the present invention will be explained in more detail.

The aqueous dispersion of a cationic electrodeposition coating composition according to the present invention includes a cationic electrodeposition synthetic resin (a) which is obtained by an amino addition reaction of a polyepoxide resin.

The cationic electrodeposition resin (a) according to the present invention is a major film forming resin in an electrodeposition coating composition. Some of these known cationic electrodeposition resin prepared by an addition of amine to polyepoxide resins are illustrated in U.S. Pat. Nos. 3,663,839; 3,984,299; 3,947,338; and 3,947,339. These film forming resins represent a resin having an amino group formed by an addition reaction of polyepoxide with a primary, secondary, or tertiary amine. In the present invention, the cationic electrodeposition resin may be prepared by using polyepoxide, polycaprolactonediol, bisphenol A and benzyl dimethyl amine. As for the cationic electrodeposition synthetic resin formed by the addition reaction of polyepoxide and amine, a resin having the following structural formula can be illustrated:

In the present invention, when the amount of the cationic electrodeposition synthetic resin used (a) in the electrodeposition coating composition is less than about 40 percent by weight, mechanical properties of the dried coating layer are weak, and when the amount of the cationic electrodeposition synthetic resin having an amino group used exceeds 60 percent by weight, the manufacturing of an aqueous dispersion is difficult. Therefore, the used amount of the cationic electrodeposition resin is preferably about 40–60 percent by weight, and more preferably about 45–55 percent by weight.

In addition, another cationic electrodeposition resin, an acrylic cationic electrodeposition resin (b) which is copolymerized with butyl acrylate, isobornyl methacrylate, methyl acrylate, hydroxy ethyl acrylate, styrene, methyl methacrylate, (N,N-dimethyl)aminoethyl metacrylate, etc., can be illustrated. The structural formula of the acrylic cationic electrodeposition resin is as follows:

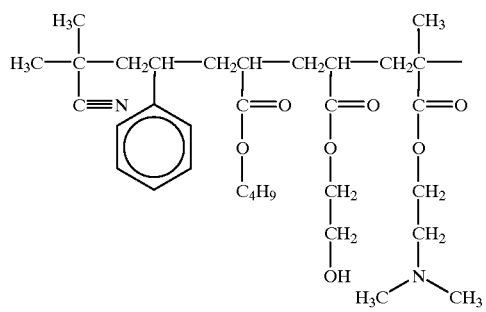

If the amount of the acrylic cationic electrodeposition resin used in the electrodeposition coating composition is less than 5 percent by weight, a dried coating film having an epoxy-acrylic double-layered structure cannot be obtained, which is unpreferable, and if the amount of the acrylic cationic electrodeposition resin used exceeds 10 percent by weight, the epoxy resin and acrylic resin are not compatible, thereby unpreferably affecting the surface appearance and gloss. Therefore, the amount of the acrylic cationic electrodeposition resin used is preferably about 5–10 percent by weight, and more preferably about 7–9 percent by weight.

The aqueous dispersion of the present invention includes an ester-modified styrene-allylalcohol copolymer (c) pre-

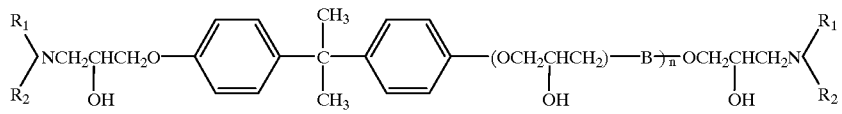

wherein $R_1$, $R_2$ and B are as follows, and n is an integer of 3 or 4.

pared by an esterification reaction of the hydroxyl group of styrene-allylalcohol copolymer with a fatty acid in order to

|  | $R_1$ | $R_2$ | B |
|---|---|---|---|
| N-methylethanol amine | —$CH_3$ | —$(CH_2)_2OH$ | —[—$(CH_2)_5$—CO—O—]— (—$CH_2)_5$— |
| diketimine | —$CH_2N=C(CH_3)CH_2CH(CH_3)_2$ | $R_2=R_1$ | | improve the smoothness of the electrodeposition coating film and to inhibit pinhole and cratering. The ester-modified styrene-allylalcohol copolymer which has the following structural formula (repeating unit) can be illustrated:

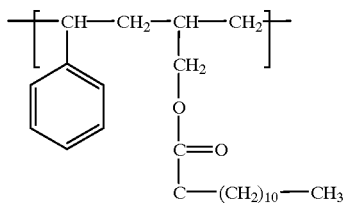

The molecular weight (weight-average molecular weight) of ester-modified styrene-allylalcohol copolymer is preferably between about 2000 and about 40,000, and more preferably between about 3000 and about 30,000. If the amount of ester-modified styrene-allylalcohol copolymer used in the electrodeposition coating composition is less than about one percent by weight, an improvement of the smoothness of the electrodeposition coating film and the restraint of pinhole and cratering cannot be achieved. If the amount of ester-modified styrene-allylalcohol copolymer used in the electrodeposition coating composition exceeds 3 percent by weight, mechanical properties of the dried coating film such as pencil hardness deteriorates. Therefore, the amount of the fatty acid ester resin used is preferably about 1–3 percent by weight, and more preferably about 1.5–2.5 percent by weight.

The aqueous dispersion of the present invention includes a crosslinking agent. The crosslinking agent used in the present invention is a polyurethane type crosslinking agent which is prepared by the reaction of a mixture of diphenylmetane-4,4-diisocyanate and hexamethylene diisocyanate which are partially-blocked with methylethyl ketoxime with trimethylol propane at a mole ratio of about 3:1. As for the blocked diisocyanate crosslinking agent, a compound having the following structural formula can be illustrated:

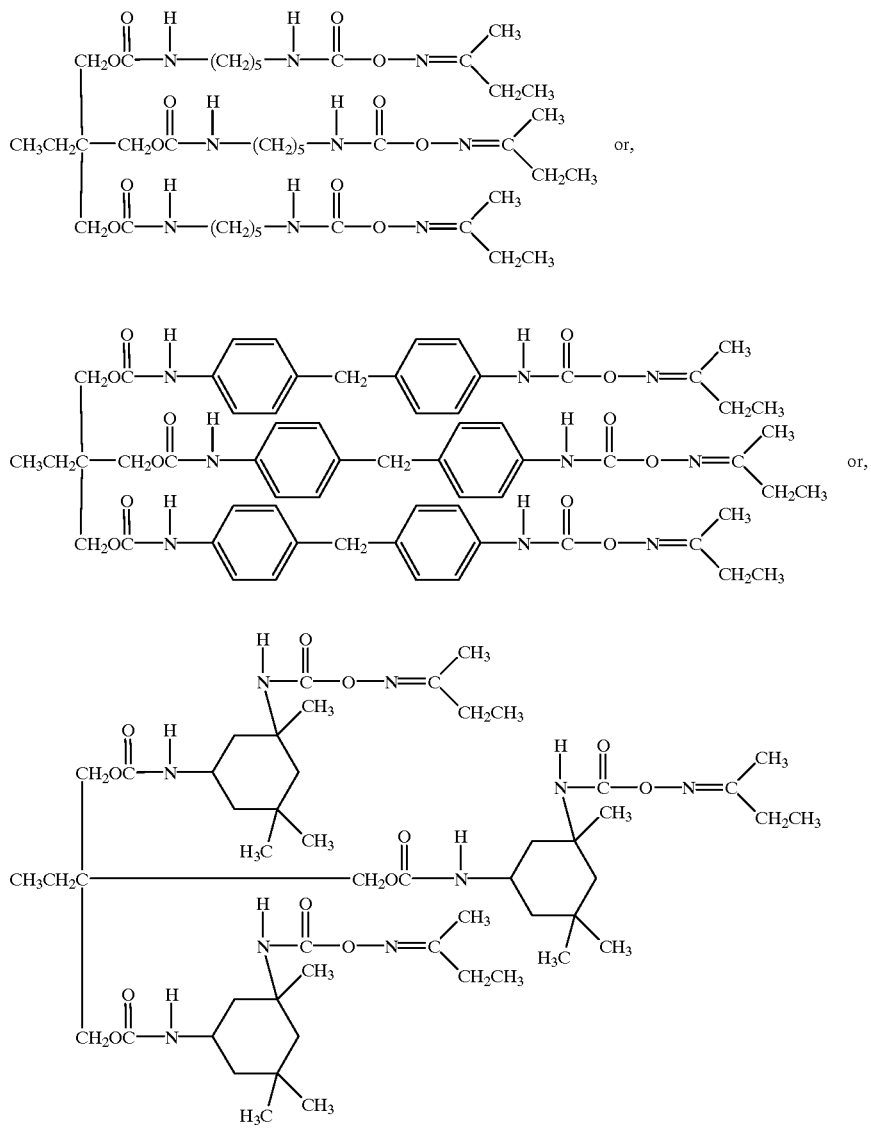

If the amount of the blocked diisocyanate crosslinking agent used in the electrodeposition coating composition is less than 30 percent by weight, properties such as pencil hardness, corrosion resistance, etc., are diminished. If the amount of the blocked diisocyanate crosslinking agent used in the electrodeposition coating composition exceeds 50 percent by weight, the preparation of the aqueous dispersion is difficult and properties such as impact-resistance, flexible-resistance, etc., are diminished. Therefore, the amount of the blocked diisocyanate crosslinking agent used is preferably about 30–50 percent by weight, and more preferably 35–45 percent by weight.

In accordance with the present invention, the cationic electrodeposition composition can be manufactured in the presence of a low boiling point organic solvent by using (a) about 40–60 percent by weight of a cationic electrodeposition synthetic resin obtained by an amino addition reaction of a polyepoxide resin, (b) about 5–10 percent by weight of an acrylic cationic electrodeposition resin having an amino group, (c) about 1–3 percent by weight of ester-modified styrene-allylalcohol copolymer synthesized by an ester exchange reaction of the hydroxyl group of the styrene-allylalcohol copolymer with a fatty acid, and (d) about 30–50 percent by weight of a polyurethane type crosslinking agent which is prepared by the reaction of a mixture of diphenylmetane-4,4-diisocyanate and hexamethylene diisocyanate which are partially-blocked and methylethyl ketoxime with trimethylol propane.

The low boiling point organic solvent has a boiling point less than approximately 140° C. The low boiling point organic solvents may include methylisobutylketone, xylene, toluene, methylethylketone, etc. can be illustrated.

The aqueous dispersion of a cationic electrodeposition coating composition is manufactured by preparing an aqueous dispersion by mixing about 100 parts by weight consisting of a composition consisting about 35–45 percent by weight of the cationic electrodeposition resin composition and about 55–65 percent by weight of deionized water, 0.3–1.5 parts by weight of a neutralization agent and 0.5–1.0 parts by weight of a cationic surfactant. The organic solvent of said aqueous dispersion is stripped under a reduced pressure to partially remove the organic solvent from said aqueous dispersion at about 40–80° C. and under a pressure of about 30–90 mmHg, preferably about 50–70 mmHg.

During the process of using the neutralization agent, the degree of neutralization of the existing amino group is preferably about 20–100%, and more preferably is about 40–70%. According to a suitable neutralization method, a neutralizing agent such as formic acid, acetic acid, lactic acid, phosphoric acid, etc., a surfactant, deionized water, etc., are added and water-dispersed by a high-speed stirring so that excellent water-dispersed resin solution may be obtained.

Successively, a solvent stripping of the low boiling point organic solvent is performed as mentioned above so as to have a solid content of about 20–60 percent by weight, preferably about 30–40 percent by weight which comprises the cationic electrodeposition resin. After the solvent stripping process, the aqueous dispersion is filtered through diatomaceous earth in such a manner that an improved aqueous dispersion of the cationic electrodeposition coating composition can be obtained. The average particle size of the improved aqueous dispersion of the cationic electrodeposition coating composition is less than 0.3 μm and the organic solvent content is minimized. The aqueous dispersion thus obtained is highly functional and low-temperature curable.

When preparing the aqueous dispersion of the present invention by using the cationic electrodeposition compositions, the aqueous dispersion may contain pigments, solvents and additives such as a surface improving additive, a surfactant, a thickening agent, a catalyst, etc. As the catalyst, a metallic salt of organic acids such as cobalt acetate, chromeoctoate, chromenaphthenate, lead acetate and dibutyltinoxide is usually used.

Hereinafter, the present invention will be explained in more detail referring to the working examples. However, the present invention is not limited to the following embodiments. The parts are by weight and percent is by weight too.

SYNTHETIC EXAMPLE 1

A cationic acrylic electrodepostion resin (b) was manufactured using the following mixture.

| ingredients | weight parts |
| --- | --- |
| methyl isobutyl ketone | 34.7 |
| butyl acrylate | 6.2 |
| styrene | 29.3 |
| (N,N-dimethyl)aminoethyl methacrylate | 5.9 |
| 2-hydroxyethyl acrylate | 11.8 |
| methyl methacrylate | 1.8 |
| isobornyl methacrylate | 4.1 |
| methyl isobutyl ketone | 0.9 |
| azobisisobutyronitrile | 0.7 |
| methyl isobutyl ketone | 1.9 |
| azobisisobutyronitrile | 0.7 |

34.7 parts of methyl isobutyl ketone was introduced into a flask and held under nitrogen atmosphere at 110° C. Then a mixture of 6.2 parts of butyl acrylate, 29.3 parts of styrene, 5.9 parts of (N,N-dimethyl)aminoethyl methacrylate, 11.8 parts of 2-hydroxyethyl acrylate, 1.8 parts of methyl methacrylate and 4.1 parts of isobornyl methacrylate at 115° C. was dropped in over four hours. At the same time, a mixture of 0.7 parts of azobisisobutyronitrile and 1.9 parts of methyl isobutyl ketone was added dropwise through another funnel for over four hours. After one hour, a mixture of 0.7 parts of azobisisobutyronitrile and 1.9 parts of methyl isobutyl ketone was added dropwise to the resultant material through a funnel for over an hour. After the addition, the mixture was held for three hours to obtain an acrylic cationic electrodeposition resin whose amine value was 30–40 and solid content was 60 percent.

SYNTHETIC EXAMPLE 2

An ester-modified styrene-allylalcohol copolymer synthesized by an esterification reaction of the hydroxyl group of the styrene-allylalcohol copolymer with a fatty acid was manufactured from the following mixture.

| ingredients | weight parts |
| --- | --- |
| coconut fatty acid | 9.9 |
| styrene-allylalcohol copolymer | 60.3 |
| xylene | 1.9 |
| methyl isobutyl ketone | 27.9 |

After 9.9 parts of palm (or coconut) oil (fatty acid) and 60.3 parts of styrene-allylalcohol copolymer were introduced into a flask and heated to 140° C. to be melted, the resultant mixture was heated to 220° C. and held at this temperature to obtain an ester-modified styrene-allylalcohol synthesized by an esterification reaction of the hydroxyl group of the styrene-allyalcohol copolymer with the fatty acid. The acid value of the ester-modified styrene-allylalcohol copolymer was less than 4 and the solid content thereof was 70.

EXAMPLE 1

From the mixture having the following ingredients, a cationic electrodeposition resin composition was manufactured.

| ingredients | weight parts |
| --- | --- |
| EPIKOTE 828CD[*1] | 27.1 |
| PLACCEL 205[*2] | 9.7 |
| bisphenol A | 7.9 |
| methyl isobutyl ketone | 2.4 |
| benzyl dimethyl amine | 0.15 |
| acrylic cationic electrodeposition resin (synthetic example 1) | 9.0 |
| ester-modified styrene-allylalcohol copolymer (synthetic example 2) | 1.6 |
| partially-blocked diisocyanate cross-linking agent[*3] | 40.5 |
| diketimine derived from diethylene triamine and methyl isobutyl ketone (73○ of solid content in methyl isobutyl ketone) | 3.0 |
| N-methylethanolamine | 2.6 |

[*1] EPIKOTE 828CD is an epoxy resin manufactured by the reaction of epichlorohydrin and bisphenol A, which may be purchased from Shell Chemical Co., Ltd. in Korea. The epoxy equivalent weight thereof was approximately 188.
[*2] PLACCEL 205 is a polycaprolactonediol which may be purchased from DICEL Corp. in Japan.
[*3] The blocked diisocyanate cross-linking agent was manufactured from the mixture having the following ingredients. A mixture containing diphenylmethane-4,4-diisocyanate (COSMONATE PH: trade name which may be purchased from Kumho-Mitsui Toatsu, Co., Ltd. in Korea) and hexamethylene diisocyanate was partially blocked with methylethyl ketoxime. Then, the resulting product was reacted with trimethylolpropane at a molar ratio of 3:1 to form the polyurethane type cross-linking agent.

27.1 parts of EPIKOTE 828CD, 9.7 parts of PLACCEL 205, 7.9 parts of bisphenol, A and 2.4 parts of methyl isobutyl ketone were introduced into a reactor. The mixture was then heated to 140° C. under a nitrogen atmosphere. Then 0.04 parts of benzyl dimethyl amine was added to the reaction mixture, which was heated to 210° C. and was reacted at a reflux temperature for thirty minutes to remove water. The resultant mixture was cooled to 160° C. and held in that state for one and half hours. Then, the resulting mixture was cooled to 145° C. and 0.11 parts of benzyl dimethyl amine was added to the resulting product, which was reacted at 145° C. for approximately two and half hours to prepare the cationic electrodeposition synthetic resin (a) obtained by an amino addition reaction of polyepoxide resin. To the cationic electrodeposition synthetic resin (a) obtained by an amino addition reaction, 9.0 parts of an cationic acrylic electrodeposition resin (b) having (N,N-dimethyl) aminoethyl methacrylate, 1.6 parts of an ester-modified styrene-allylalcohol copolymer (c) synthesized by an esterification reaction of the hydroxyl group of the styrene-allylalcohol copolymer with a fatty acid and 40.5 parts of a half-blocked diisocyanate cross-linking agent (d) were sequentially and slowly added at the same temperature. Next, 3.0 parts of diketimine (73% of solid content in methyl isobutyl ketone) derived from diethylene triamine and methyl isobutyl ketone and 2.6 parts of N-methyl ethanol amine were added to the resultant at 100–110° C., which was held at 125° C. for an hour to obtain the cationic electrodeposition resin composition.

EXAMPLE 2

An aqueous dispersion of the cationic electrodeposition resin composition was prepared from a mixture of the following ingredients.

| ingredients | weight parts |
| --- | --- |
| cationic electrodeposition resin composition according to the Example 1 | 103.95 |
| acetic acid | 1.2 |
| cationic surfactant[*1] | 1.4 |
| deionized water | 158.3 |

[*1] The cationic surfactant is the commercially available XS-139, which may be purchased from Air Products and Chemical Inc..

158.3 parts of the deionized water, 1.2 parts of an acetic acid and 1.4 parts of a cationic surfactant, XS-139, were successively introduced into a reactor and homogenized. Then, 103.95 parts of the cationic electrodeposition resin was slowly added and was stirred at a high speed in order to disperse it in water. Meanwhile, a solvent stripping process was performed at 60° C. and under a reduced pressure of approximately 60 mmHg in order to remove low boiling point organic solvent, thereby obtaining an initial aqueous dispersion. Then, the initial aqueous dispersion was filtered through diatomaceous earth so that the cationic electrodeposition resin composition of the obtained aqueous dispersion whose solid content was 40% and average particle size was less than 0.31 $\mu$m could be obtained. Organic solvent in the obtained aqueous dispersion of the cationic electrodeposition resin composition was not found.

EXAMPLE 3

Preparation of low-temperature curable electrodeposition coating composition

A mixture of 0.9 parts of carbon black, 24 parts of titanium dioxide, 5.0 parts of lead silicate, 1.8 parts of aluminum silicate, 50.3 parts of deionized water, and 18 parts of the pigment grinding vehicle were ground in a bead mill to have a particle size of less than 15 $\mu$m, thereby obtaining a pigment paste. 9.8 parts of the pigment paste, 40.7 parts of the aqueous dispersion of the cationic electrodeposition resin composition obtained in Example 2 and 49.5 parts of deionized water were homogeneously stirred to obtain the low-temperature curable cationic electrodeposition coating composition.

Preparation of a pigment grinding vehicle

A pigment grinding vehicle was prepared by reacting polyglycidyl ether of bisphenol A, a partially blocked isocyanate cross-linking agent and organic tertiary aminate as follows.

| ingredients | weight parts |
| --- | --- |
| EPPIKOTE 3004CD[*1] | 29.0 |
| propylene glycol monomethyl ether acetate | 10.0 |
| partially blocked isocyanate cross-linking agent[*2] | 12.0 |
| ethylene glycol monobutyl ether | 33.0 |

-continued

| ingredients | weight parts |
|---|---|
| organic tertiary aminate*³ | 14.0 |
| deionized water | 2.0 |

*¹) Polyglycidylether of bisphenol A (epoxy equivalent weight 900–1200), which may be purchased from Shell Chemical, Co., Ltd. in Korea, was used.
*²) The used half-blocked isocyanate cross-linking agent was prepared by reacting 54.3 parts of 2,4-tolueneisocyanate and 40.7 parts of 2-ethylhexanol at less than 40° C. for three hours, adding 5.0 parts of methyl isobutyl ketone and diluting.
*³) The used organic tertiary aminate was manufactured as follows 15.5 parts of dimethyl ethanol amine and 56.7 parts of the half-blocked isocyanate cross-linking agent were reacted at a room temperature for two hours. The disappearance of NCO peak could be confirmed at 80° C. Then, 17.4 parts of lactic acid (purity 88○), 3.5 parts of deionized water and 7.0 parts of ethylene glycol monobutyl ether were added and reacted at 60° C. for an hour to obtain the organic tertiary aminate.

29.0 parts of EPIKOTE 3004CD and 10.0 parts of propylene glycol monomethyl ether acetate were added to a reactor and heated to 110–120° C. so as to melt homogeneously. To the resulting product was added 12.0 parts of the half-blocked isocyanate cross-linking agent, and the resulting product was held for an hour. Next, 33.0 parts of ethylene glycol monobutyl ether was added to the resulting product, which was heated to 80–90° C. Thereafter, 14.0 parts of organic tertiary aminate and 2.0 parts of deionized water were added to the resulting product, which was held until the acid value became approximately 1 so the pigment grinding vehicle was obtained. At this time, the epoxy equivalent weight of the polyglycidyl ether of bisphenol A was 900–1200.

EXAMPLE 4

Aqueous dispersion of the cationic eletrodeposition resin composition was prepared in the same manner as in Example 2 by using the cationic electrodeposition resin composition except that, instead of the crosslinking agent of Example 1, a polyurethane type crosslinking agent which has been prepared by partially blocking the mixture of hexamethylene diisocyanate (HDT; trade name made by Nippon Polyurethane Co., Ltd. in Japan) and isophorone diisocyanate (VESTANAT IPDI; trade name made by Huels Co., Ltd. in Germany) with methylethyl ketoxime and then reacting the resultant material with trimethlyol propane at a molar ratio of 3:1 was used.

COMPARATIVE EXAMPLE 1

An aqueous dispersion of a cationic electrodeposition resin was manufactured in the same manner as in Example 2 by using the cationic electrodeposition resin composition synthesized by the same method as in Example 1, except that instead of the crosslinking agent of Example 1, a crosslinking agent which has been prepared by partially-blocking the mixture (PAPI-135K; trade name made by Dow Korea Co., Ltd.) of polymethylene-polyphenyl diisocyanate, diphenylmethane-2,4-diisocyanate and diphenylmethane-4,4-diisocyanate with diethyleneglycolmonobutyl ether and then reacting the resultant with trimethlyol propane at a molar ratio of 3:1 was used, and that an acrylic cationic electrodeposition resin (b) having (N,N-dimethyl) aminoethyl methacrylate (Synthetic Example 1) and ester-modified styrene-allylachole copolymer synthesized by an esterification reaction of the hydroxyl group of the styrene-allylalcohol copolymer with a fatty acid (Synthetic Example 2) were not added to the cationic electrodeposition resin composition.

COMPARATIVE EXAMPLE 2

An aqueous dispersion of a cationic electrodeposition resin was manufactured in the same manner as in Example 2 by using the cationic electrodeposition resin composition synthesized by the same method as in Example 1, except that instead of the crosslinking agent of Example 1, a crosslinking agent which has been prepared by partially blocking the mixture of hexamethylene diisocyanate (HDI; trade name manufactured by Nippon Polyurethane Co., Ltd. in Japan) and isophorone diisocyanate (VESTANAT IPDI; trade name manufactured by Huels Co., Ltd in Germany) with ε-caprolactame and then reacting the resultant material with trimethlyol propane at a molar ratio of 3:1 was used, and that a acrylic cationic electrodeposition resin (b) having (N,N-dimethyl)aminoethyl methacrylate (Synthetic Example 1) and ester-modified styrene-allylachole copolymer synthesized by an esterification reaction of the hydroxyl group of the styrene-allylalcohol copolymer with a fatty acid (Synthetic Example 2) were not added to the cationic electrodeposition resin composition.

Aqueous dispersions were prepared in the same manner as in Example 3 by using the electrodeposition coating composition obtained from Examples 2 and 4 and Comparative Examples 1 and 2. Then, an electrodeposition coating was performed at 28° C. and at a voltage of 200 for three minutes, and baked for thirty minutes. The properties of the obtained film having the thickness of 24 μm were examined. The test results on the film are illustrated in Table 1.

Table 1

Test Results of the Properties on the Electrodeposition Coated Film of Examples 2 and 4 and in Comparative Examples 1 and 2

|  | Example 2 | Example 4 | Comparative Example 1 | comparative example 2 |
|---|---|---|---|---|
| appearance | ⊙ | ⊙ | ⊙ | ⊙ |
| baking temperature | 125° C. | 125° C. | 165° C. | 180° C. |
| gloss (60° glossmeter) | 68 | 67 | 64 | 65 |
| pencil hardness (Mitsubishiuni) | 2H | 2H | 2H | 2H |
| adhesion*¹ | ⊙ | ⊙ | ⊙ | ⊙ |
| impact-resistance*⁷ (1/2" × 500 g × 50 cm) | OK | OK | OK | OK |

-continued

|  | Example 2 | Example 4 | Comparative Example 1 | comparative example 2 |
|---|---|---|---|---|
| flexible-resistance*[8] (Mandrel Conical) | OK | OK | OK | OK |
| corrosion resistance 1*[2] | ⊙ | ⊙ | ⊙ | ⊙ |
| corrosion resistance 2*[3] | ⊙ | ⊙ | ⊙ | ⊙ |
| water-resistance*[4] | ⊙ | ⊙ | ⊙ | ⊙ |
| solvent-resistance*[5] | ⊙ | ⊙ | ⊙ | ⊙ |
| yellowing resistance*[6] | ⊙ | ⊙ | Δ | Δ |
| weather-resistance*[9] | ⊙ | ⊙ | Δ | Δ |

* note : ⊙; excellent, ○good, Δ; average, X; bad
*[1]) cross-cut: A taping test was performed by cross-cutting the film in a size of 1 mm × 1 mm within a size of 1 cm × 1 cm.
*[2]) corrosion resistance 1: After spraying 5○NaCl solution to the film at 35° C. over a thousand hours and allowing it to stand for twenty-four hours, a taping test was performed.
*[3]) corrosion resistance 2: After immersing the film in 5○NaCl solution at 50° C. for two-hundred forty hours, a taping test was performed.
*[4]) water-resistance: After immersing the film in 50° C. hot water of for two-hundred forty hours, the appearance of the coating layer was observed.
*[5]) solvent-resistance: After reciprocating rubbing the film twenty times with methyl isobutyl ketone solvent, the presence of some abnormality in the coating layer was observed.
*[6]) yellowing resistance: After coating a small amount of white enamel paint on the electrodeposition coated test plate, curing at 150° C. for more than forty minutes and drying, the degree of yellowing resistance in the top coating was tested.
*[7]) impact-resistance: The test was executed five times by means of an impact-resistance tester manufactured from Dupont Co. wherein a coating layer which was not destroyed more than four times was regarded as OK.
*[8]) flexible-resistance: The test was executed five times by means of a Mandrel Conical flexible-resistance tester wherein a coating layer which did not crack more than four times was regarded as OK.
*[9]) weathering resistance: Gloss and color difference were tested by means of a Weather-O-Meter (W.O.M) for two hundred hours.

As shown in Table 1, the coating layer formed by using the cationic electrodeposition coating composition of Examples 2 and 4 using the cationic resin having (N,N-dimethyl)aminoethyl metacrylate (Synthetic Example 1) and the ester-modified styrene-allylalcohol copolymer synthesized by an esterification reaction of the hydroxyl group of the styrene-allylalcohol copolymer and one fatty acid (Synthetic Example 2), was cured at a temperature of 125° C. and has an excellent appearance, yellowing resistance, weather resistance, etc. Meanwhile the coating layer formed by using the cationic electrodeposition coating composition of Comparative Examples 1 and 2 without employing the above components, was cured at a temperature above 165° C., and has a common level of yellowing resistance and weather resistance.

As described above, the aqueous dispersion of the cationic electrodeposition resin composition in the cationic electrodeposition coating composition according to the present invention does not contain an organic solvent. Since water is used as a dispersing medium, the coated film may solve the environmental problem so as to avoid the regulations related to the regulation of emission of organic solvents. Further, the cationic electrodeposition coating composition by using the aqueous dispersion of the cationic electrodeposition resin composition according to the present invention has a superior low-temperature curability. The cured coated film has an epoxy-acrylic double-layered structure to give a high functionality, and for improving properties such as weather-resistance, yellowing resistance, etc.

What is claimed is:

1. A cationic electrodeposition resin composition for an aqueous dispersion of a cationic electrodeposition coating composition, said cationic electrodeposition resin composition comprising:
   (a) about 40–60 percent by weight of a cationic electrodeposition synthetic resin product of amino addition to a polyepoxide resin;
   (b) about 5–10 percent by weight of an acrylic cationic electrodeposition resin having an amino group;
   (c) about 1–3 percent by weight of an ester-modified styrene-allyalcohol copolymer esterification product of styrene-allyalcohol copolymer and a fatty acid; and
   (d) about 30–50 percent by weight of a polyurethane-type crosslinking agent reaction product of methylethyl ketoxime-partially-blocked diisocyanate and trimethylol propane.

2. The cationic electrodeposition resin composition as claimed in claim 1, wherein said acrylic cationic electrodeposition resin is a copolymer of at least one member selected from the group consisting of butyl acrylate, isobornyl methacrylate, hydroxyethyl acrylate, styrene, methyl methacrylate, and (N,N-dimethyl)aminoethyl methacrylate.

3. The cationic electrodeposition resin composition as claimed in claim 1, wherein said ester-modified styrene-allyalcohol copolymer is the esterification product of a hydroxyl containing styrene-allylalcohol copolymer and coconut oil, and the weight average molecular weight of said ester-modified styrene-allylalcohol copolymer is about 2,000 to about 40,000.

4. The cationic electrodeposition resin composition as claimed in claim 1, wherein said polyurethane type crosslinking agent is the reaction product of an aryl or alkyl which is diisocyanate which is partially-blocked with methylethyl ketoxime, or a mixture thereof, and trimethylol propane.

5. The cationic electrodeposition resin composition as claimed in claim 4, wherein said aryl diisocyanate is diphenylmethane-4,4-diisocyanate and said alkyl diisocyanate is hexamethylene diisocyanate or isophorone diisocyanate.

6. The cationic electrodeposition resin composition as claimed in claim 1, wherein said aqueous dispersion includes:

about 100 parts by weight of a composition consisting of about 35 to about 45% by weight of said cationic electrodepostion coating composition and about 55 to 65% by weight of deionized water;

about 0.3 to 1.5 parts by weight of a neutralization agent; and about 0.5 to 1.5 parts by weight of a cationic surfactant.

7. The cationic electrodeposition resin composition as claimed in claim 6, wherein said neutralizing agent is at least one member selected from the group consisting of formic acid, acetic acid, lactic acid, and phosphoric acid.

8. A method for manufacturing an aqueous dispersion of a cationic electrodeposition resin composition, comprising the steps of:

preparing a cationic electrodeposition resin composition in the presence of an organic solvent comprising (a) about 40–60 percent by weight of a cationic electrodeposition synthetic resin product of amino addition to a polyepoxide, (b) about 5–10 percent by weight of an acrylic cationic electrodeposition resin having an amino group, (c) about 1–3 percent by weight of an ester-modified styrene-allyalcohol copolymer esterification product of styrene-allyalcohol copolymer with a fatty acid; and (d) about 30–50 percent by weight of a polyurethane-type crosslinking agent reaction product of methylethyl ketoxime-partially-blocked diisocyanate and trimethylol propane;

preparing an initial aqueous dispersion by mixing about 100 parts by weight consisting of a composition consisting about 35–45 percent by weight of said cationic electrodeposition resin composition and about 55–65 percent by weight of deionized water, 0.3–1.5 parts by weight of a neutralization agent and 0.5–1.0 parts by weight of a cationic surfactant; and stripping the organic solvent of said initial aqueous dispersion under a reduced pressure to remove the organic solvent from said initial aqueous dispersion, and filtering said initial aqueous dispersion, thereby obtaining the aqueous dispersion.

9. The method as claimed in claim 8, wherein the step of stripping the organic solvent of said initial aqueous dispersion is performed at about 40–80° C. and under a pressure of about 30–90 mmHg.

10. The method as claimed in claim 8, said method further comprising the step of filtering said initial aqueous dispersion by using diatomite so as to have an average particle size of no more than 0.3 µm.

11. The method as claimed in claim 8, wherein said organic solvent is at least one member selected from the group consisting of methyl isobutyl ketone, xylene, toluene, and methyl ethyl ketone.

12. The cationic electrodeposition resin composition as claimed in claim 5, wherein said polyurethane type crosslinking agent is the reaction product of an aryl or alkyl diisocyanate partially-blocked with methylethyl ketoxime, or a mixture thereof, and trimethylol propane.

13. The cationic electrodeposition resin composition as claimed in claim 12, wherein said ester-modified styrene-allyl alcohol copolymer is the esterification product a hydroxyl containing styrene-allyl alcohol copolymer and coconut oil, and the weight average molecular weight of said ester-modified styrene-allyl alcohol copolymer is about 2,000 to about 40,000.

14. The cationic electrodeposition resin composition as claimed in claim 13, wherein said acrylic cationic electrodeposition resin is a copolymer of at least one member selected from the group consisting of butyl acrylate, isobornyl methacrylate, hydroxyethyl acrylate, styrene, methyl methacrylate, and (N,N-diethyl)aminoethyl methacrylate.

15. The cationic electrodeposition resin composition as claimed in claim 14, wherein the amount of (a) is about 45–55%, the amount of (b) is about 7–9%, the amount of (c) is about 1.5–2.5%, and the amount of (d) is 35–45%.

16. The cationic electrodeposition resin composition as claimed in claim 1, wherein the amount of (a) is about 45–55%, the amount of (b) is about 7–9%, the amount of (c) is about 1.5–2.5%, and the amount of (d) is 35–45%.

17. The cationic electrodeposition resin composition as claimed in claim 16, wherein said aqueous dispersion includes:

about 100 parts by weight of a composition consisting of about 35 to about 45% by weight of said cationic electrodeposition coating composition and about 55 to 65% by weight of deionized water;

about 0.3 to 1.5 parts by weight of a neutralization agent; and about 0.5 to 1.5 parts by weight of a cationic surfactant.

18. The method as claimed in claim 8, wherein the amount of (a) is about 45–55%, the amount of (b) is about 7–9%, the amount of (c) is about 1.5–2.5%, and the amount of (d) is 35–45%.

19. The method as claimed in claim 18, wherein the step of stripping the organic solvent of said initial aqueous dispersion is performed at about 40–80° C. and under a pressure of about 30–90 mmHg.

20. The method as claimed in claim 19, said method further comprising the step of filtering said initial aqueous dispersion by using diotomite so as to have an average particle size of no more than 0.3 µm.

* * * * *